Figures 2, 3:
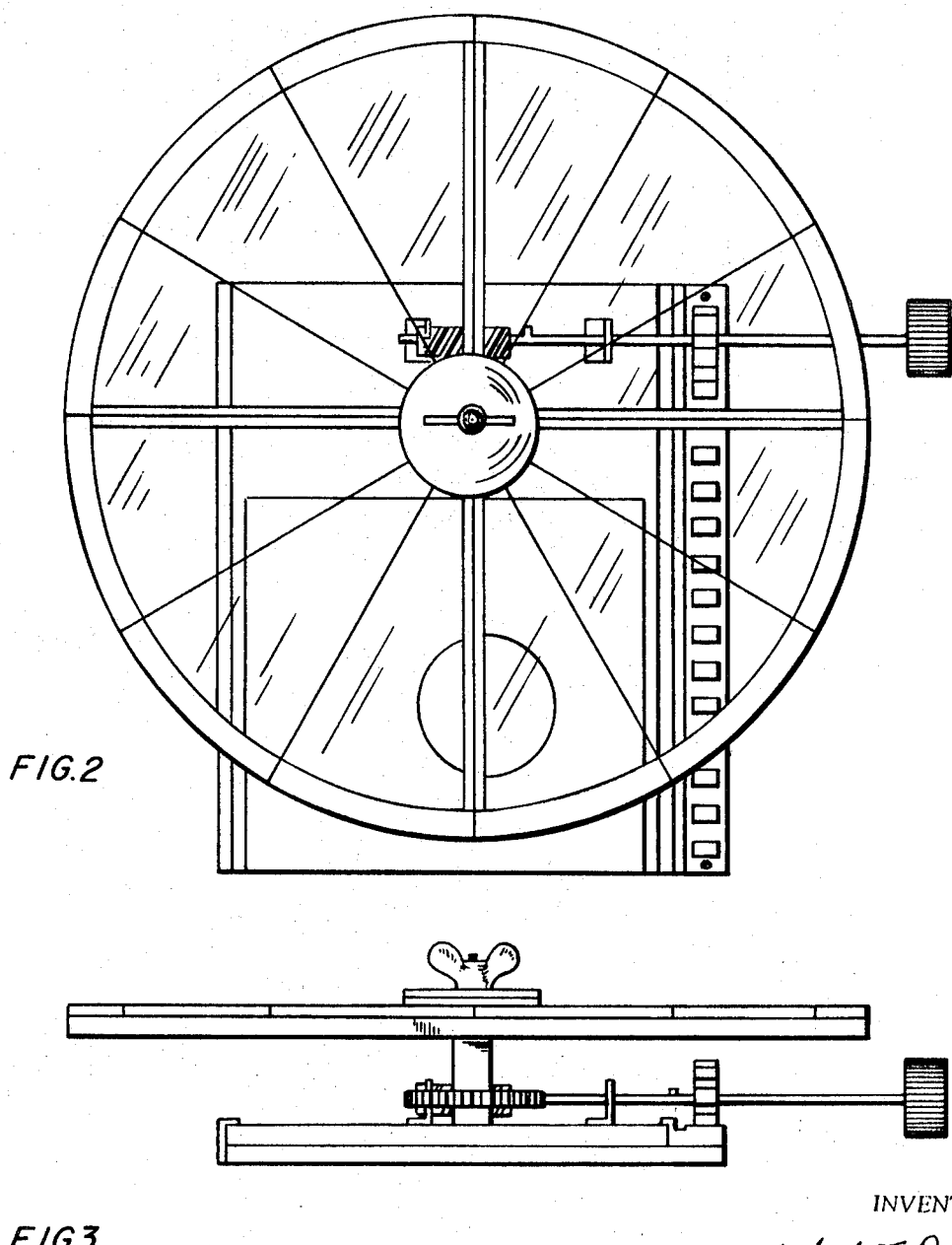

United States Patent

[11] 3,625,586

| [72] | Inventor | Michael T. Olexa<br>P.O. Box 3080 Sabraton Station,<br>Morgantown, Va. 26505 |
|---|---|---|
| [21] | Appl. No. | 851,647 |
| [22] | Filed | Aug. 20, 1969 |
| [45] | Patented | Dec. 7, 1971 |

[54] LINEARLY AND ROTATIONALLY ADJUSTABLE MULTISLIDE MICROSCOPE STAGE
1 Claim, 3 Drawing Figs.

[52] U.S. Cl. ............................................. 350/90,
74/29, 269/61, 350/92
[51] Int. Cl. ....................................... G02b 21/24
[50] Field of Search .............................. 350/86–90,
92; 269/61; 74/29

[56] References Cited
UNITED STATES PATENTS

| 1,713,412 | 5/1929 | Winkel | 350/86 |
|---|---|---|---|
| 2,003,387 | 6/1935 | Ott | 350/86 |
| 2,279,412 | 4/1942 | Posada | 350/90 |
| 2,325,239 | 7/1943 | Flint | 350/90 |

FOREIGN PATENTS

| 1,043,161 | 9/1966 | Great Britain | 350/90 |

Primary Examiner—David Schonberg
Assistant Examiner—Toby H. Kusmer

ABSTRACT: This invention comprises a multiple slide-carrying microscope stage, having integral mechanical means for the reproducible linear and rotational motion of the specimens thereon.

PATENTED DEC 7 1971 3,625,586
SHEET 1 OF 2
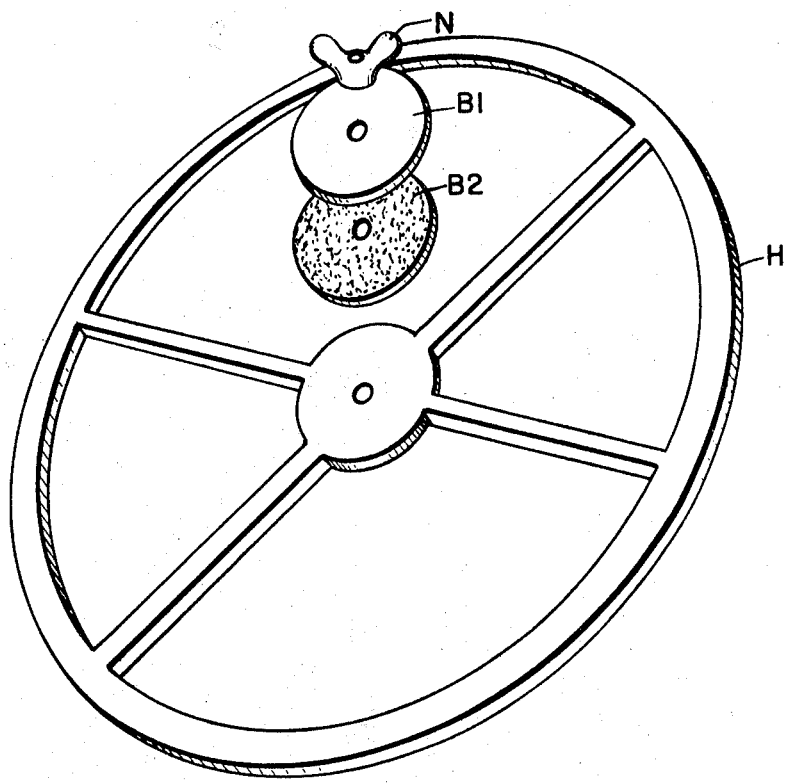
FIG. 1
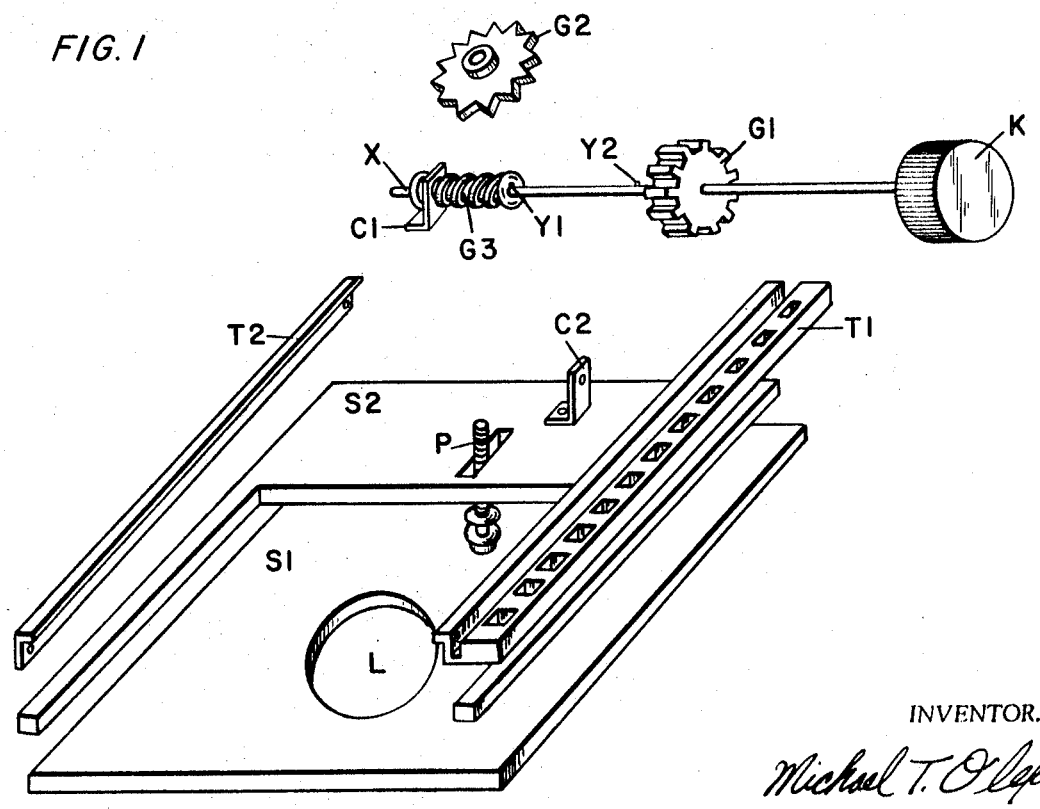
INVENTOR.
Michael T. O'Lefa INVENTOR.
Michael T. Oleta

LINEARLY AND ROTATIONALLY ADJUSTABLE MULTISLIDE MICROSCOPE STAGE

Conventional specimen stages for typical optical microscopes have certain operational deficiencies. One of these is the lack of ability on the part of the user thereof to reproducibly move a specimen in the viewing field. Indeed, in the ordinary situation, even this irreproducible motion is not conveniently accomplished and is usually effected by direct digital manipulation. Such a technique is neither sophisticated nor convenient.

A somewhat connected deficiency in such a conventional microscope stage involves the awkward means for replacing one specimen with another. These shortcomings are especially acute when a microscope is being used as the image source for a visual aids presentation, for example in conjunction with a microprojector. Such difficulties are compounded when the purpose is to compare a sequence of slide preparations, for example where successive microtome sections of a specimen are being observed.

Needless to say, these are but exemplary of the deficiencies of the present art to be overcome by the invention herein to be disclosed. Other advantages of the present invention are its simplicity and hence its economy in production. Furthermore, the stage of the present invention may be produced for independent use or for use as an accessory with more conventional microscope stages.

FIG. 1 is a vertically expanded view of the present invention in one of its simplest forms. The major components, as shown, are a circular slide holder, H, and two substages, S1 and S2. The lower substage, S1, as shown is intended for attachment to the conventional specimen stage, although it may be made for attachment to a microscope as the only specimen stage thereon. Such attachment may be effected by any convenient means. For example, it may be merely set on the conventional stage, or, for more stable installations, may be held in place by magnets imbedded in the body of S1 or by simple clamps. Such means of attachment, it will be readily seen, are not a critical feature of this invention, and many such means will occur to those skilled in the art.

S1 is shown with a perforation, L, which allows passage of illumination to the specimen from a light source, not shown. Such source, be it mirror or lamp, for example, will depend on the instrument and its use, and likewise does not constitute a critical aspect of this invention. Indeed, it is not even necessary that the substage, S1, be perforated as long as provision for specimen illumination is made. For example, L, may be a transparent window, or S1 itself may be constructed of a light-passing substance.

Substage S2, upon which the slide holder, H, is attached, is itself connected to S1 by means of two tracks, T1 and T2, as shown. The tracks are permanently mounted on the lower substage, S1, by screws as shown or by any other suitable means. Then, by means of indentations in T1 and a toothed spur gear, G1, S2 and the holder, H, may be made to reproducibly move back and forth in the viewing field.

The slide holder, H, shown here without slides, is a simple circular member with spokes coming in therefrom to a flat, circular, perforated member in the center thereof. By means of a pin, P, through the center member, also running through a sprocket or similar toothed gear, G2, the holder, H, is then connected to the upper substage, S2, for example, through a hole or notch in that substage. An elongated notch, as shown, is preferred over a circular perforation. This allows longitudinal motion of the pin, P, to accommodate different sizes of sprocket, G2.

Insofar, as the sprocket, G2, in conjunction with a worm gear, G3, permanently mounted on S2, may be used to reproducibly rotate the slides on H in the viewing field, the use of different diameter sprockets, G2, may be used to alter the speed of rotation, and inversely the degree of control, of the specimen. The pin P, thus is shown as a simple bolt with conventional washers, being fitted with a wing nut, N, on its upper threaded end as shown. However, as will become more apparent later, it may be preferable to use a cylindrical pinch clamp device in lieu of N. Also on the pin, P, are shown a rigid and a flexible bushing, B1 and B2, respectively. As will be discussed in more detail below, these bushings may be used to fasten specimen slides in lace on the slide holder, H.

Coming more specifically to the gearing mechanisms, it will be noted that both the worm gear, G3, and the spur gear, G1, are turned by the same knob, K, on the shaft, X. This would suggest simultaneous operation of G1 and G3, but this invention does not preferably contemplate that mode of operation. More preferably, by means of small teeth, Y1 and Y2, placed on X and complementary indentations in the sides of G1 and G3, the mode of operation is alternative. That is, it is preferably to move the specimen either linearly or rotationally as opposed to doing both simultaneously. Thus, by means of the invention, as shown, the user may select rotational or linear motion by pushing the knob, K, toward or pulling it out away from the center of the viewing field, respectively. These positions are illustrated by FIGS. 1 and 3, and FIG. 2, respectively.

Provisions are shown for preventing lateral motion of G1 and G3 with the shaft, X, as modes of operation are changed and Y1 and Y2 are respectively engaged and disengaged with G3 and G1 respectively, or vise versa. Such provisions are made by notched and perforated "L" clamps, C1 and C2, respectively, C2 being somewhat optional and primarily for stability. It will be noted that worm gear, G3, has a flange opposite the knob, K. which by extending through and onto the other side of C1 prevents the lateral motion of G3 with X. Such a clamp is not needed to prevent lateral motion of G1 insofar as the teeth of this spur gear engaged with T1 will accomplish that end.

FIGS. 2 and 3 merely illustrate nonexpanded top and end views of the invention, respectively and, as mentioned above, depict the placement of Y1 and Y2 as the two modes of operation, linear and rotational have been chosen, respectively.

FIG. 2, however, illustrates additionally an important aspect of this invention. Shown thereon are pie-shaped slides which are particularly well suited for use with the present invention. While 12 such slides are shown thereon, the number certainly is not critical and is solely a function of the portion of the arc of the holder, H, occupied thereby. Depending on the requirements of a given application, they might be smaller or larger than shown. Such slides are especially easily attached to the holder, H, by the insertion of their tips under the bushings, B1 and B2, with the softer, flexible bushing, B2, being, of course, on the bottom.

Use of a wing nut, N, as shown to tighten these bushings down might tend to break the tips of the slides if caution were not used in such an application. This problem, however, may be alleviated by the use of a cylindrical pinch clamp as mentioned above which would not enable the user to exert inadvertently excessive pressure on the slide tips.

Neither the mode of attachment nor the optimization of the area of H by pie-shaped slides, however, would preclude the use of conventional rectangular slides with the stage of the present invention. As with the pie-shaped slides, they could be merely placed on the holder or further fastened thereto with small spring clamps. Such things are certainly within the purview of the skilled artisan and are not critical to this invention.

The advantages of this invention should thus be apparent. For example selective, accurate comparison of a dozen or so sequential microtome sections may be most expeditiously accomplished. Such work could even be improved by the simple expedient of fixing a pointer on S2 and placing gradations, for example in degrees, along the circumference of H. Using such a measurement in conjunction with the number of the sprocket hole of T1 that the spur gear was engaged with would enable one to reproducibly designate a specific sector of a specimen and readily bring it into the viewing filed of a given microscope weeks or even months after it was so designated. Of course, such usage may be even further enhanced by the use of verniers, very finely toothed gears and the like, giving maximum control to the user.

The present invention would be quite a boon to an instructor used in conjunction with a microprojector. Being able to load the stage with a multitude of specimens, the relevant sector of each being known in advance, would be quite a time saver to the harried instructor trying to coordinate slide projections with a lecture.

Thus, while several optional embodiments, uses, and advantages of the present invention have been both shown and discussed with preferable ones being emphasized, the specific disclosure herein is, by no means, intended to be other than illustrative. Depending upon the use of the present invention, a diversity of valuable possibilities should occur to those skilled in the art.

Having thus disclosed my invention, its construction and use, as well as its advantages over the prior art, I hereby claim as my invention the following:

1. A microscope specimen stage assembly comprising:
   a. an immovable lower substage with means for the attachment thereof to a microscope, said means for the attachment comprising magnets embedded in said lower substage holding the assembly in a stable position on the specimen stage of the microscope;
   b. a mobile upper substage mounted thereon having means for moving said upper substage over said lower substage in a backward and forward direction in relation to the user,
      said means for moving said upper substage being a spur gear mounted thereon in conjunction with a complementarily indented track mounted on the aforesaid lower substage, and means for the rotation of said spur gear;
   c. and a circular, specimen slide holder mounted thereon having means for rotating said holder in a plane above said upper substage, wherein said means for rotating the aforesaid holder is a pin mounted therethrough having a sprocket gear mounted thereon which acts in conjunction with a worm gear mounted on the aforesaid upper substage, and means for the rotation of said worm gear;
   d. said means for moving said upper substage and said means for rotating the aforesaid holder are attached to the same motion generating device; means being provided for the alternative movement of the upper substage and the holder;
      said means for providing alternative movement for the rotation of the worm and sprocket gears comprises a single shaft slidably fitted through said worm and sprocket gears, said shaft having two small protrusions which cause the aforesaid gears to rotate therewith when one of said protrusions is engaged with a complementary indentation on the side of the aforesaid worm and sprocket gears; said wormgear being prohibited from transverse motion with respect to said upper substage by means of a slotted L clamp mounted on the upper substage acting in conjunction with a flanged element of the said wormgear protruding therethrough; and,
   e. means are provided for the recording of the position of the upper substage in relation to the lower substage, and for the recording of the position of the holder in relation to the upper substage.

* * * * *